US012304023B2

(12) United States Patent
Williams

(10) Patent No.: US 12,304,023 B2
(45) Date of Patent: May 20, 2025

(54) OFFSET-ANGLE EXTENSION DEVICES FOR ROTATING POWER TOOLS

(71) Applicant: Toyota Motor Engineering & Manufacturing North America, Inc., Plano, TX (US)

(72) Inventor: Vinson Oliver Williams, Raleigh, NC (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 717 days.

(21) Appl. No.: 17/496,163

(22) Filed: Oct. 7, 2021

(65) Prior Publication Data

US 2023/0114743 A1    Apr. 13, 2023

(51) Int. Cl.
*B23Q 5/04* (2006.01)
*B25F 3/00* (2006.01)
*B25F 5/02* (2006.01)

(52) U.S. Cl.
CPC .............. *B23Q 5/045* (2013.01); *B25F 3/00* (2013.01); *B25F 5/02* (2013.01); *B23B 2231/04* (2013.01)

(58) Field of Classification Search
CPC ....... B23Q 5/045; B25F 3/00; B23B 2231/04; B23B 51/126
See application file for complete search history.

(56) References Cited

U.S. PATENT DOCUMENTS

| 2,102,929 | A | * | 12/1937 | Wallace | B23B 45/06 81/36 |
| 2,106,937 | A | * | 2/1938 | Torbert, Jr. | B23B 45/001 408/127 |
| 2,291,729 | A | * | 8/1942 | Koett | B27C 3/08 408/124 |
| 2,571,589 | A | * | 10/1951 | Lindell | B27C 3/08 408/124 |
| 3,208,542 | A | | 9/1965 | Fischer | |
| 4,687,386 | A | * | 8/1987 | Mayer | B23Q 5/045 408/112 |
| 5,348,428 | A | | 9/1994 | Turner | |
| 5,720,542 | A | * | 2/1998 | Birge, Jr. | F21V 33/0084 362/120 |
| 6,125,721 | A | * | 10/2000 | Yang | B23Q 5/045 81/177.4 |

(Continued)

FOREIGN PATENT DOCUMENTS

CN 103068531 A * 4/2013 ........... B23B 45/003
CN 112296377 B   5/2021

(Continued)

Primary Examiner — Eric A. Gates
(74) Attorney, Agent, or Firm — Dinsmore & Shohl LLP

(57) ABSTRACT

An offset-angle extension device for a power tool includes an elongated body having a power tool mounting end and an angle adapter end. A bearing housing with a handle is located between and connected to the power tool mounting end and the angle adapter end. The bearing housing includes a bearing that receives a bit extension rod therethrough. A tool mounting rod extends from the bearing housing to the power tool mounting end and connects to the power tool. The bit extension rod extends from a chuck of the power tool, through the bearing and connects to an offset-angle angle adapter.

15 Claims, 4 Drawing Sheets

(56) References Cited

U.S. PATENT DOCUMENTS

| | | | | |
|---|---|---|---|---|
| 6,293,172 | B1 * | 9/2001 | Smith | B25B 23/18 |
| | | | | 81/177.2 |
| 8,459,373 | B2 * | 6/2013 | Reynolds | B25F 5/00 |
| | | | | 173/46 |
| 11,969,869 | B1 * | 4/2024 | Martin | B25B 23/0028 |
| 2005/0034276 | A1 * | 2/2005 | Badiali | B25F 5/026 |
| | | | | 16/426 |
| 2020/0353605 | A1 * | 11/2020 | Kaye, Jr. | B25B 23/0028 |

FOREIGN PATENT DOCUMENTS

| | | | | |
|---|---|---|---|---|
| DE | 102008019278 A1 | * | 10/2009 | B23Q 5/045 |
| EP | 0623429 A1 | * | 11/1994 | |
| GB | 670262 A | * | 4/1952 | |
| GB | 1034445 A | * | 6/1966 | |
| KR | 101863741 B1 | | 6/2018 | |

* cited by examiner

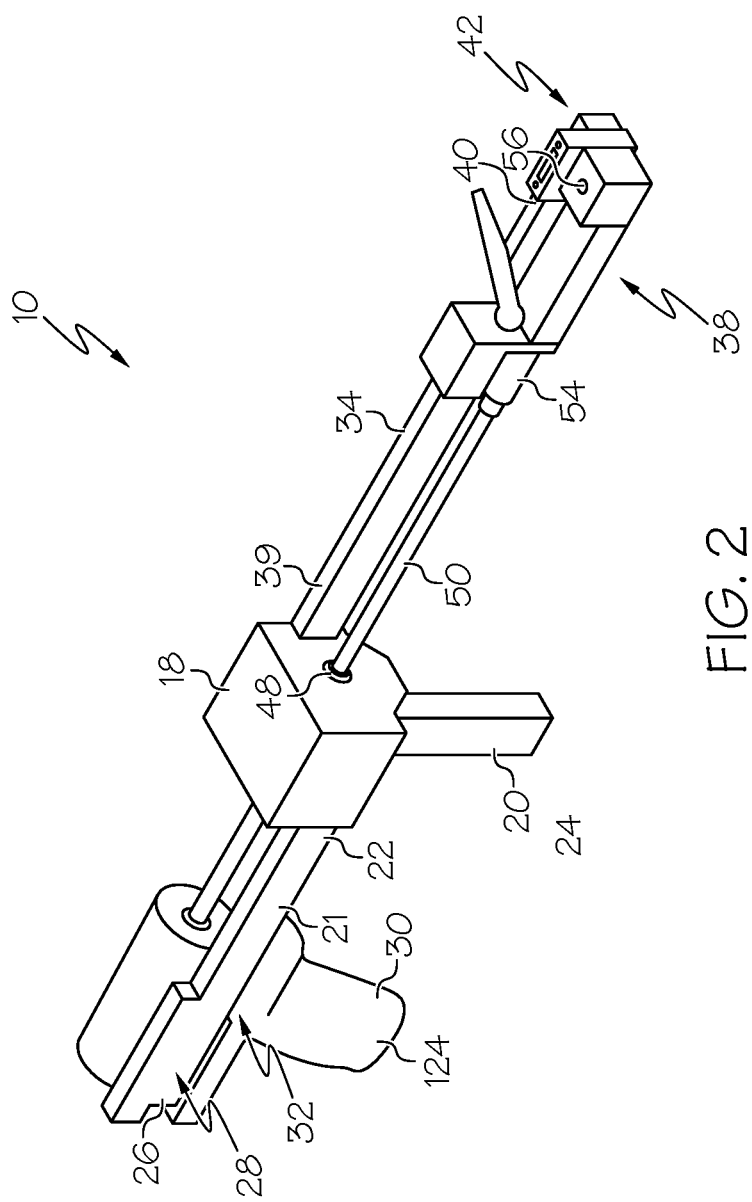

OFFSET-ANGLE EXTENSION DEVICES FOR ROTATING POWER TOOLS

TECHNICAL FIELD

The present specification generally relates to power tools and, more specifically, to offset-angle extension devices for rotating power tools.

BACKGROUND

Right-angle driver attachments exist that are flexible and can be bent to realign an axis of rotation. These flexible right-angle driver attachments are typically freely rotatable around the driver's driving axis and need to be manually held at their end effector to maintain tool-to-nut/bolt contact for a tightening or loosening operation. Such manual contact at the end effector can be physically cumbersome and limit the reach of the right-angle drill attachment Accordingly, a need exists for an offset-angle extension device for rotating power tools that provide an angle realignment of the driving axis and that also extend the reach of the operator.

SUMMARY

In one embodiment, an offset-angle extension device for a power tool includes an elongated body having a power tool mounting end and an angle adapter end. A bearing housing with a handle is located between and connected to the power tool mounting end and the angle adapter end. The bearing housing includes a bearing that receives a bit extension rod therethrough. A tool mounting rod extends from the bearing housing to the power tool mounting end and connects to the power tool. The bit extension rod extends from a chuck of the power tool, through the bearing and connects to an offset-angle angle adapter.

A method of assembling an offset-angle extension device for a power tool is provided. The method includes mounting a bearing within a through opening of a bearing housing. A front end of a tool mounting rod is mounted to the bearing housing. The tool mounting rod includes a tool mounting structure for mounting a power tool. A rear end of an adapter mounting rod is mounted to the bearing housing. The adapter mounting rod includes an adapter mounting structure for mounting an offset-angle adapter. A bit extension rod is inserted through an opening in the bearing.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2 is a perspective view of the offset angle extension device of FIG. 1, according to one or more embodiments shown and described herein;

DETAILED DESCRIPTION

Embodiments described herein are generally related to offset-angle extension devices for power tools. The offset-angle extension devices include a power tool mounting end and an angle adapter end. A bearing housing with a handle is located between and connected to the power tool mounting end and the angle adapter end. The bearing housing includes a bearing that receives a bit extension rod therethrough. A tool mounting rod extends from the bearing housing to the power tool mounting end and connects to the power tool. The bit extension rod extends from a chuck of the power tool, through the bearing and connects to an offset-angle angle adapter. An adapter mounting rod extends from the bearing housing to the angle adapter end and connects to the offset-angle adapter. When the bit extension rod is operably connected to the chuck of the power tool and the offset-angle adapter, rotation of the chuck rotates the bit extension rod that extends through the bearing. Rotation of the bit extension rod rotates a head of the angle adapter that connects to a shank of an end effector. The rotational axis of the head is angularly offset from the rotational axis of the chuck.

Figure 1:
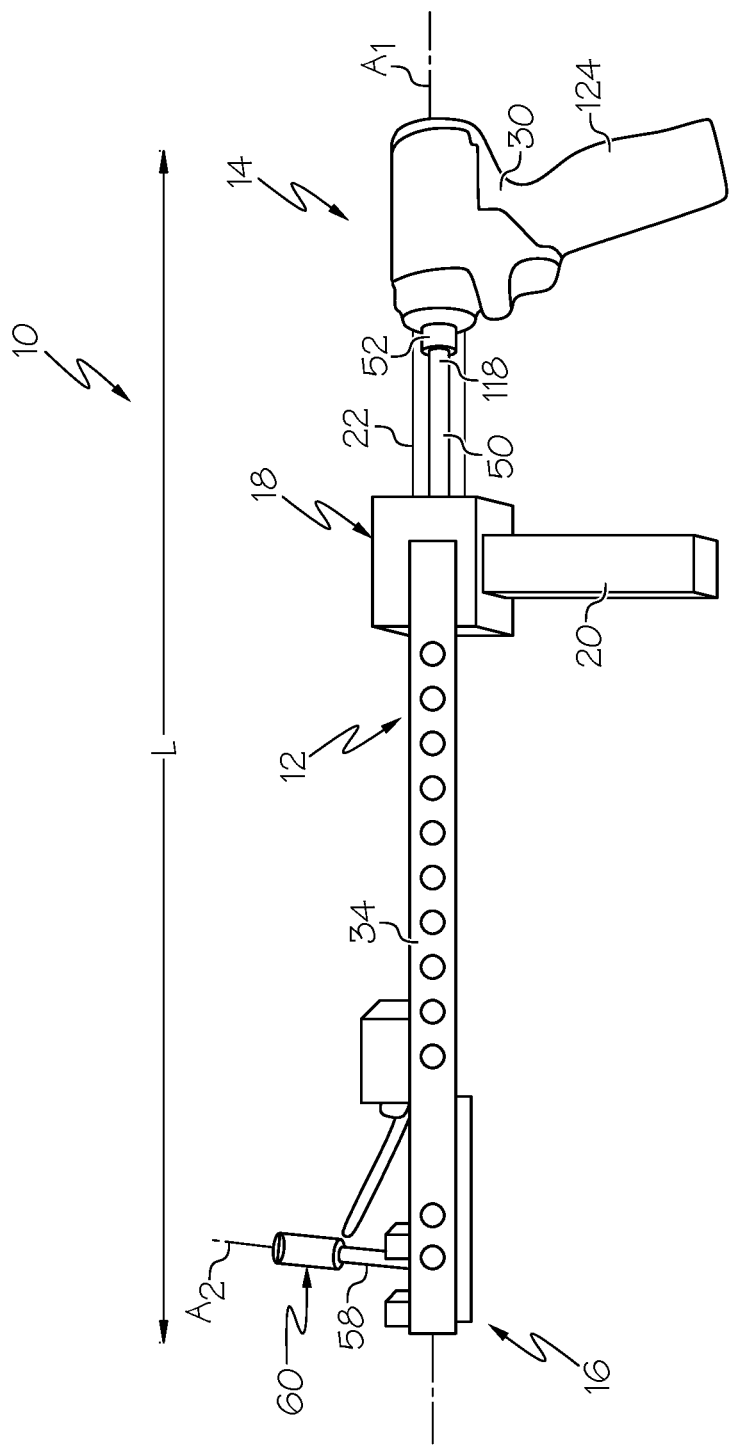
FIG. 1 is a diagrammatic side view of an offset-angle extension device, according to one or more embodiments shown and described herein.

Referring to FIG. 1, an offset-angle extension device 10 includes a body 12 having an overall length L that is elongated in a longitudinal direction. As used herein, the "longitudinal direction" is parallel to the elongated axis of the body 12. The "lateral direction" is transverse to the longitudinal direction. The body 12 has a power tool mounting end 14 and an angle adapter mounting end 16. A bearing housing 18 is located between the power tool mounting end 14 and the angle adapter mounting end 16. A support handle 20 extends downward from the bearing housing 18. The support handle is sized and configured to be manually grasped by an operator and held to support the offset-angle extension device 10 in a desired orientation.

The body 12 includes a tool mounting rod 22 that is fixedly mounted to the bearing housing 18. Referring also to FIG. 2, the tool mounting rod 22 includes a front end 24 mounted to the bearing housing 18 and a rear end 26 that includes a mounting structure 28 that is configured to mount to a power tool 30. As used herein, the term "power tool" refers to a tool that is actuated by an additional power source and mechanism other than only manual labor used with hand tools. A suitable power tool may be, for example, an impact driver or drill. The mounting structure 28 may be configured to be mounted to the power tool 30 using existing fastener openings in the power tool 30. The front end 26 is mounted to the bearing housing 18 outboard of a primary axis $A_1$ of rotation that is defined by the power tool 30 (FIG. 1). The mounting structure 28 can mount on a side 32 of the power tool 30. An adapter mounting rod 34 is also fixedly mounted to the bearing housing 18. The adapter mounting rod 34 includes a rear end 39 mounted to the bearing housing 18 and a front end 40 that includes mounting structure 42 that is configured to mount to an offset-angle adapter 38. The mounting structure 42 may be configured to be mounted to the offset-angle adapter 38 using existing fastener openings 44 in the offset-angle adapter 38. The rear end 39 of the adapter mounting rod 34 is mounted to the bearing housing 18 outboard of the primary axis $A_1$. The tool mounting rod 22 and the adapter mounting rod 34 are located on opposite sides of the primary axis $A_1$ and are offset laterally from each other. The power tool 30 and offset-angle adapter 38 may be any suitable commercially available power tool and angle adapter, such as commercially available from Milwaukee Electric Tool Corporation.

Figure 3:
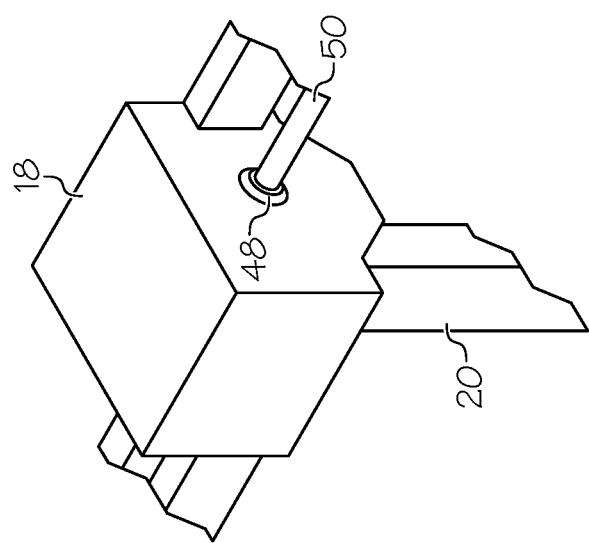
FIG. 3 is a detail view of a bearing housing of the offset-angle extension device of FIG. 2, according to one or more embodiments shown and described herein.

Referring also to FIG. 3, the bearing housing 18 includes a bearing 48 that receives a bit extension rod 50 therethrough. The bit extension rod 50 extends from a chuck 52 of the power tool 30 (FIG. 1), through the bearing 40 and connects to another chuck 54 of the offset-angle adapter 38. The offset-angle adapter 38 includes a head 56 that is configured to receive a shank 58 of an end effector 60 (FIG. 1). Rotation of the bit extension rod 50 rotates the head 56 of the offset-angle adapter 38. The rotational axis $A_2$ of the head 56 is angularly offset from the primary axis $A_1$ of the chuck 52. It can be appreciated that the power tool 30, bearing housing 18 and offset-angle adapter 38 are arranged in-line and in fixed positions relative to the primary axis $A_1$.

Figure 4:
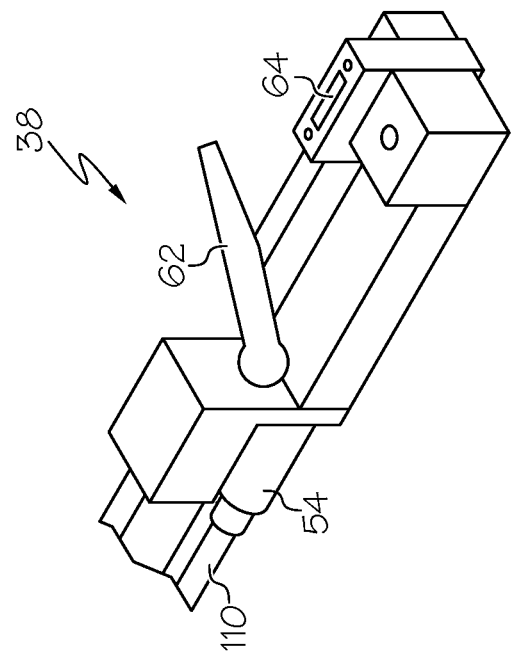
FIG. 4 is a detail view of an offset-angle adapter of the offset-angle extension device of FIG. 2, according to one or more embodiments shown and described herein.

Referring briefly to FIG. 4, the offset-angle adapter 38 may include a mirror 62 that provides a field of view in the direction of the secondary axis $A_2$. A light source 64 (e.g., an LED) may be provided for additional lighting in the direction of the secondary axis $A_2$.

Figure 5:
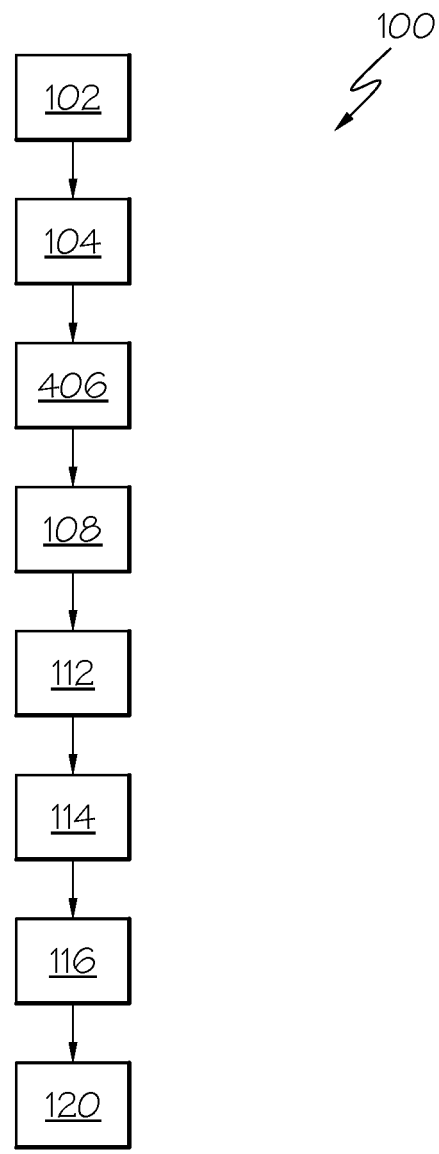
FIG. 5 is a method of assembling the offset-angle extension device of FIG. 1, according to one or more embodiments shown and described herein.

Referring to FIG. 5, a method 100 of assembling the offset-angle extension device 10 is shown. The method 100 includes mounting the bearing 40 within a through opening of the bearing housing 18 at step 102. At step 104, mounting the front end 24 of the tool mounting rod 22 to the bearing housing 18. At step 106, mounting the rear end 38 of the adapter mounting rod 34 to the bearing housing 18 such that the tool mounting rod 22 and the adapter mounting rod 34 extend longitudinally in opposite directions forming the elongated body 12. At step 108, the bit extension rod 42 may be threaded through an opening in the bearing 40. The bearing 40 facilitates smooth and continuous rotation of the bit extension rod 42 and provides longitudinal stability during operation. An end 110 of the bit extension rod 42 (FIG. 4) may be connected to the chuck 54 of the offset angle adapter 38 at step 112 and the offset-angle adapter 38 may be mounted to mounting structure 42 at angle adapter end 16 at step 114. At step 116, the chuck 52 of power tool 30 may be connected to an opposite end 118 of the bit extension rod 42 (FIG. 1) and the power tool 30 may be mounted to mounting structure 28 at the power tool mounting end 14 at step 120.

To use the offset-angle extension device 10, a user grasps the support handle 20 of the bearing housing 18 and a handle 124 of the power tool 30. The user can then raise the end effector 20 to a desired fastening/unfastening location using the handles 20 and 124. The offset-angle extension device 10 may then be supported during the fastening/unfastening operation using the handles 20, 124.

The above-described offset-angle extension devices extend the reach and change the orientation of the rotational axis of the attached power tool. The offset-angle extension devices accomplishes this re-orientation without requiring the operator to hold the offset-angle adapter for stability. The offset-angle extension devices move the operator away from the end effector, which can reduce strain in the shoulder due to reaching outward far from the body. The location of the handle 20 keeps the load of a fastening/unfastening operation relatively close to the operator's body compared to use of the power tool alone without the offset angle extension devices.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An offset-angle extension device for a power tool comprising:
    an elongated body having a power tool mounting end and an angle adapter end;
    a bearing housing with a handle is located between and connected to the power tool mounting end and the angle adapter end, the bearing housing comprising a bearing that receives a bit extension rod therethrough;
    a tool mounting rod extends from the bearing housing to the power tool mounting end and is configured to connect to the power tool;
    an adapter mounting rod that extends from the bearing housing to the angle adapter end and connects to the offset-angle adapter;
    wherein the bit extension rod extends from a chuck of the power tool, through the bearing and connects to an offset-angle angle adapter;
    wherein the tool mounting rod has a front end that is fixedly connected to the bearing housing and the adapter mounting rod has a rear end that is fixedly connected to the bearing housing such that the relative positions of the adapter mounting rod and tool mounting rod are fixed relative to the bearing housing.

2. The offset-angle extension device of claim 1, wherein when the bit extension rod is operably connected to the chuck of the power tool and the offset-angle adapter, rotation of the chuck rotates the bit extension rod that extends through the bearing.

3. The offset-angle extension device of claim 2, wherein rotation of the bit extension rod rotates a head of the offset-angle adapter that connects to a shank of an end effector, a rotational axis of the head is angularly offset from a rotational axis of the chuck of the power tool.

4. The offset-angle extension device of claim 3, wherein the power tool, the bearing housing and the angle adapter are arranged in-line and are in fixed positions relative to each other.

5. The offset-angle extension device of claim 3, wherein the offset-angle adapter comprises a light source.

6. The offset-angle extension device of claim 3, wherein the offset-angle adapter comprises a mirror that provides a field-of-view in a direction of the rotational axis of the head.

7. A method of assembling an offset-angle extension device for a power tool, the method comprising:
    mounting a bearing within a through opening of a bearing housing;
    mounting a front end of a tool mounting rod to the bearing housing, the tool mounting rod including a tool mounting structure for mounting a power tool;
    mounting a rear end of an adapter mounting rod to the bearing housing, the adapter mounting rod including an adapter mounting structure for mounting an offset-angle adapter and extending from the bearing housing connecting to the offset-angle adapter; and inserting a bit extension rod through an opening in the bearing;

wherein the tool mounting rod has a front end that is fixedly connected to the bearing housing and the adapter mounting rod has a rear end that is fixedly connected to the bearing housing such that the relative positions of the adapter mounting rod and tool mounting rod are fixed relative to the bearing housing.

8. The method of claim 7 further comprising mounting the power tool to the tool mounting structure.

9. The method of claim 7 further comprising mounting an offset-angle adapter to the adapter mounting structure.

10. The method of claim 9 further comprising connecting the bit extension rod to a chuck of the power tool and a chuck of the offset-angle adapter.

11. The method of claim 10 comprising rotating the chuck of the power tool rotates the bit extension rod that extends through the bearing.

12. The method of claim 11, wherein rotating the bit extension rod rotates a head of the offset-angle angle adapter that connects to a shank of an end effector, a rotational axis of the head is angularly offset from a rotational axis of the chuck of the power tool.

13. The method of claim 12, wherein the power tool, the bearing housing and the angle adapter are arranged in-line and are in fixed positions relative to each other.

14. The method of claim 12, wherein the offset-angle adapter comprises a light source.

15. The method of claim 12, wherein the offset-angle adapter comprises a mirror that provides a field-of-view in a direction of the rotational axis of the head.

* * * * *